United States Patent
Picard et al.

(10) Patent No.: US 10,327,305 B2
(45) Date of Patent: *Jun. 18, 2019

(54) POWER OVER ETHERNET POWERED DEVICE HAVING AUTOMATIC POWER SIGNATURE

(71) Applicant: Texas Instruments Incorporated, Dallas, TX (US)

(72) Inventors: Jean Picard, Hooksett, NH (US); David N. Abramson, Hooksett, NH (US); Karl H. Jacobs, Hampton, NH (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/037,465

(22) Filed: Jul. 17, 2018

(65) Prior Publication Data

US 2018/0324910 A1 Nov. 8, 2018

Related U.S. Application Data

(63) Continuation of application No. 14/867,635, filed on Sep. 28, 2015, now Pat. No. 10,057,959.

(60) Provisional application No. 62/057,028, filed on Sep. 29, 2014.

(51) Int. Cl.
| | |
|---|---|
| *H05B 33/08* | (2006.01) |
| *H04L 12/10* | (2006.01) |
| *H04L 12/12* | (2006.01) |
| *H04L 12/40* | (2006.01) |
| *H05B 37/02* | (2006.01) |

(52) U.S. Cl.
CPC .......... *H05B 33/089* (2013.01); *H04L 12/10* (2013.01); *H04L 12/12* (2013.01); *H04L 12/40045* (2013.01); *H05B 33/0815* (2013.01); *H05B 37/0254* (2013.01); *Y02D 50/40* (2018.01)

(58) Field of Classification Search
CPC ........... H05B 33/0815; H05B 33/0851; H05B 33/089
USPC ........................................................ 315/294
See application file for complete search history.

(56) References Cited

U.S. PATENT DOCUMENTS

| | | | |
|---|---|---|---|
| 8,441,204 B2 * | 5/2013 | Otake | ............... H05B 33/0803 315/209 R |
| 8,868,946 B2 | 10/2014 | Buhari et al. | |

(Continued)

FOREIGN PATENT DOCUMENTS

| | | |
|---|---|---|
| EP | 2701338 A1 | 2/2014 |
| WO | WO 2016054120 A1 | 4/2016 |

OTHER PUBLICATIONS

Search Report for PCT Application No. PCT PCT/US15153053, dated Dec. 29, 2015 (1 page).

(Continued)

*Primary Examiner* — Tung X Le
(74) *Attorney, Agent, or Firm* — Tuenlap Chan; Charles A. Brill; Frank D. Cimino

(57) ABSTRACT

In a Power over Ethernet (PoE) system, a Powered Device (PD) having circuitry to measure the load current from a Power Sourcing Equipment (PSE) in the PD. Circuitry compares the measured load current with a first threshold. Circuitry automatically generates load pulses for signaling the PSE, that power to the PD should be maintained.

20 Claims, 4 Drawing Sheets

(56) References Cited

U.S. PATENT DOCUMENTS

| | | | |
|---|---|---|---|
| 8,947,157 B2* | 2/2015 | Levesque | G05F 1/595 |
| | | | 327/536 |
| 9,152,161 B2 | 10/2015 | Cerutti et al. | |
| 2004/0251854 A1 | 12/2004 | Matsuda et al. | |
| 2007/0237322 A1 | 10/2007 | Hussain et al. | |
| 2009/0206776 A1 | 8/2009 | Inaba | |
| 2010/0109561 A1* | 5/2010 | Chen | H05B 41/2825 |
| | | | 315/294 |
| 2010/0123447 A1* | 5/2010 | Vecera | H02M 1/32 |
| | | | 323/290 |
| 2011/0316449 A1* | 12/2011 | Imanaka | H05B 33/0815 |
| | | | 315/307 |
| 2012/0060042 A1 | 3/2012 | Buhari et al. | |
| 2012/0102341 A1 | 4/2012 | Hussain et al. | |
| 2012/0104860 A1 | 5/2012 | Feng | |
| 2012/0280617 A1 | 11/2012 | Josefowicz | |
| 2013/0073874 A1 | 3/2013 | Eghbal | |
| 2013/0154603 A1 | 6/2013 | Cerutti et al. | |
| 2014/0340615 A1 | 11/2014 | Kikuchi et al. | |
| 2015/0077009 A1* | 3/2015 | Kunimatsu | H05B 33/0809 |
| | | | 315/224 |
| 2015/0194881 A1 | 7/2015 | Wendt | |
| 2015/0303687 A1 | 10/2015 | Yseboodt | |
| 2015/0365003 A1 | 12/2015 | Sadwick | |
| 2016/0028233 A1 | 1/2016 | Cerutti et al. | |
| 2016/0334856 A1 | 11/2016 | Yseboodt et al. | |

OTHER PUBLICATIONS

Guo, et al. "TPS23752 Maintain Power Signature Operation in Sleep Mode," Texas Instruments Incorporated, Application Report, WLVA588—Apr. 2013, pp. 1-13.

Extended European Search Report; dated May 28, 2018. 9 pages.

Notification of Transmittal of the International Search Report and the Written Opinion of the International Searching Authority, or the Disclosure; dated Jun. 28, 2018, 7 pages.

\* cited by examiner

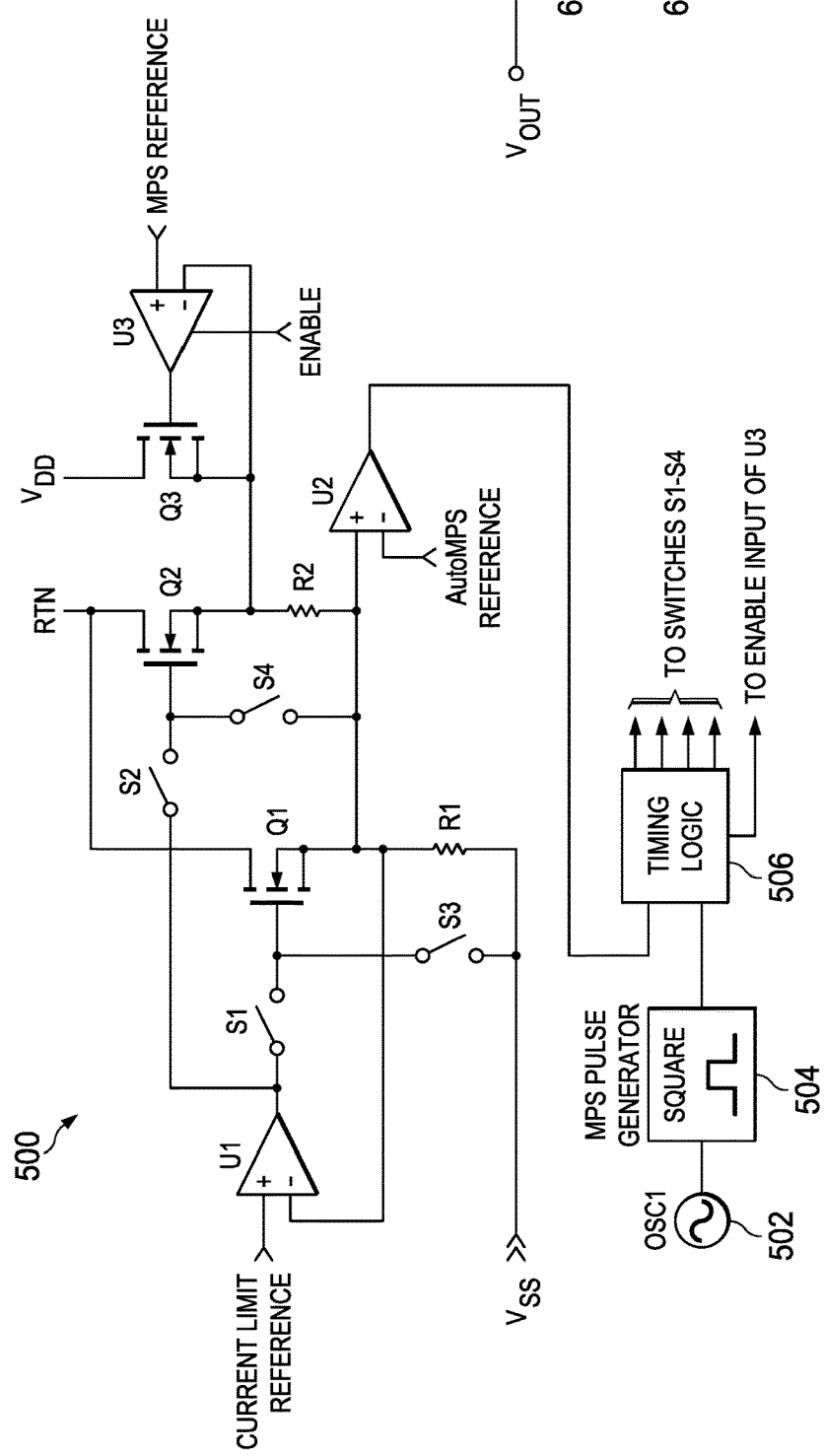

POWER OVER ETHERNET POWERED DEVICE HAVING AUTOMATIC POWER SIGNATURE

CROSS-REFERENCE TO RELATED APPLICATIONS

Under 35 U.S.C. § 120, this continuation application claims benefits of and priority to U.S. patent application Ser. No. 14/867,635 (TI-75530), filed on Sep. 28, 2015, which claims the benefit of U.S. Provisional Patent Application No. 62/057,028, filed Sep. 29, 2014. The entirety of the above referenced applications is hereby incorporated by reference herein for all purposes.

FIELD

This disclosure relates to Power over Ethernet (PoE) and, more specifically, to Maintaining Power Signature (MPS) operation in sleep mode.

BACKGROUND

Power over Ethernet is a system which allows electrical power to be passed down Ethernet cabling along with data. This permits a single Ethernet cable, such as category 5 or category 6 cabling, to provide both a data connection and electrical power to devices; such as wireless access points, IP cameras, and IP telephones, without the need to run separate power and data cabling. This can save considerable cost when installing a new system or when changes need to be made to an existing system, because it eliminates the need for an electrician to install a local AC power point when the system is installed or move the AC power point, when a device on the network is moved and is no longer close to a power outlet.

These systems are often subject to IEEE standards, such as IEEE standard 802.3 or the current version, IEEE Std 802.3-2012. The higher power amounts available in newer systems has led to their being utilized for backup power supplies, which must always be functional, and LED lighting systems, where some vital functionality must be maintained even though the light is simply turned off. The IEEE standard requires that the power to the PD from the PSE be removed if the current consumption falls below a predetermined limit, such as 5 mA or 10 mA. In order to maintain power to the PD, the PD may provide a maintain power signature (MPS) which is an electrical signature assuring the PSE that the PD still requires power. A valid MPS consists of a minimum DC current, such as 10 mA or a 10 mA pulse at least 75 ms in duration delivered at least once every 325 ms, and an AC impedance lower than 26.3 KΩ in parallel with 0.05 µF. In addition, the new IEEE standard 802.3bt will most likely use the same technique but with different current level and timing values. In addition, 802.3bt will likely also remove the AC impedance requirements.

Current systems either maintain the power drawn by the PD above the minimum or require an activation signal from an external source in order to provide current pulses to meet the MPS requirements.

Accordingly, there is a need for a circuit within the PD that automatically determines the need for MPS signal, without the need for an externally generated signal, and which provides the MPS pulses in order to maintain power to the PD while minimizing the power consumed.

SUMMARY

An aspect constructed according to the principles of the present disclosure includes a Power over Ethernet (PoE) system including a Powered Device (PD) having a PD interface circuit which includes circuitry to measure load current from a Power Sourcing Equipment (PSE) in the PD. Circuitry compares measured load current with a first threshold. Circuitry responsive to the circuitry to compare automatically generates load pulses for signaling the PSE that power to the PD should be maintained.

An aspect constructed according to the principles of the present disclosure includes an interface circuit for a Powered Device (PD) that can be coupled to a Power Sourcing Equipment (PSE) in a Power over Ethernet (PoE) system having a comparator coupled to a first resistor through which current flows from the PSE when connected to a load within the PD, the comparator measuring a voltage drop across the first resistor to determine the load current and generate an output signal representative of the load current. A timing logic responsive to the output signal generates switch control signals and an enable signal. A switch responsive to one of switch control signals inserts a second resistor in a current path of the first resistor for generating a more accurate current pulse in order to meet MPS requirements. An error amplifier coupled to the current path and responsive to the enable signal automatically generates a load pulse of sufficient magnitude that, along with load current drawn by the PD, signals the PSE that power to the PD should be maintained.

An aspect constructed according to the principles of the present disclosure includes a Powered Device (PD) for Power over Ethernet (PoE) systems having a comparator measuring load current in the PD and comparing the load current to a reference and generating an output signal. A timing logic circuit responsive to the output signal generates an enable signal. An error amplifier responsive to the enable signal generates an output voltage based on a reference. A resistor coupled to an output of the error amplifier draws a current pulse when coupled to a Power Sourcing Equipment (PSE) to automatically signal the PSE that power to the PD should be maintained.

An aspect constructed according to the principles of the present disclosure includes a method for operating a Power over Ethernet (PoE) Powered Device (PD) having an LED general lighting load detecting a load current below a predetermined limit. Automatically generating Maintain Power Signature (MPS) pulses to signal a Power Sourcing Device (PSE) supplying power to the PD, that power to the PD should be maintained.

BRIEF DESCRIPTION OF DRAWINGS

Further aspects of the invention will appear from the appending claims and from the following detailed description given with reference to the appended drawings.

FIG. 5 is a schematic diagram of a second embodiment in accordance with the present disclosure;

FIG. 6 shows an LED load for the PD.

DETAILED DESCRIPTION

Figure 1:
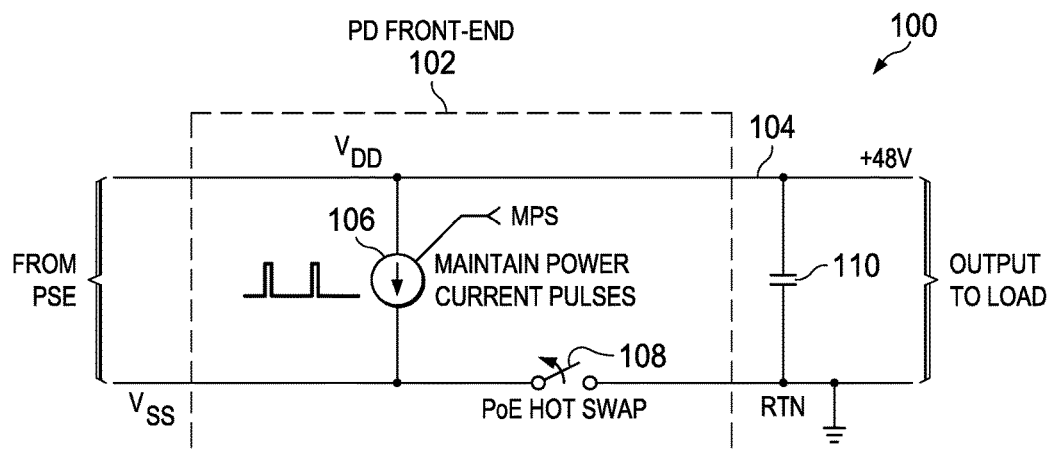
FIG. 1 is a diagram of a system of the prior art.

FIG. 1 shows a system, according to the prior art, generally as 100. Power flows from the PSE through the PD front end 102 to the PD system 104 and capacitor 110 which is part of a load (not shown). Power flowing to the load is controlled by PoE hot-swap switch 108. If the load current is less than required, to maintain power to the PD from the PSE, an external circuit (not shown) generates a MPS signal supplied to the circuit 106 to cause the circuit 106 to generate maintain power current pulses on the input line from the PSE. The externally generated pulse may be generated by a microprocessor located in a separate integrated circuit from the PD interface circuit (PD front-end circuit 102), thus requiring an additional integrated circuit. This not only increases the cost to the end-user, it increases the complexity as well, as the end-user must now provide a circuit that measures the power consumption, generates the MPS signal, and does so in a way which minimizes the power consumed by the measuring device, such as a resistive shunt. It is also known to receive a signal from the application circuit when the user presses a button that puts an IP phone to sleep. The MPS pulses are generated until it receives a wake signal that, again, is generated from the user pressing a button.

Figure 2:
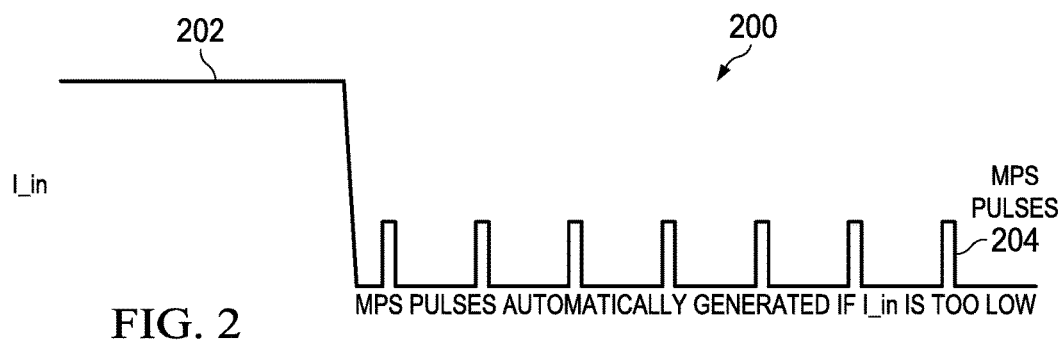
FIG. 2 is a diagram of MPS pulses automatically generated if I_in is too low.

FIG. 2 shows the waveform for the input current to the PD, generally as 200. In FIG. 2, when the current I_in 202 drops below the value required to maintain power to the PD, MPS pulses of a magnitude, duration and pulse frequency are automatically generated in accordance with aspects of the present application, as shown at 204.

Figure 3:
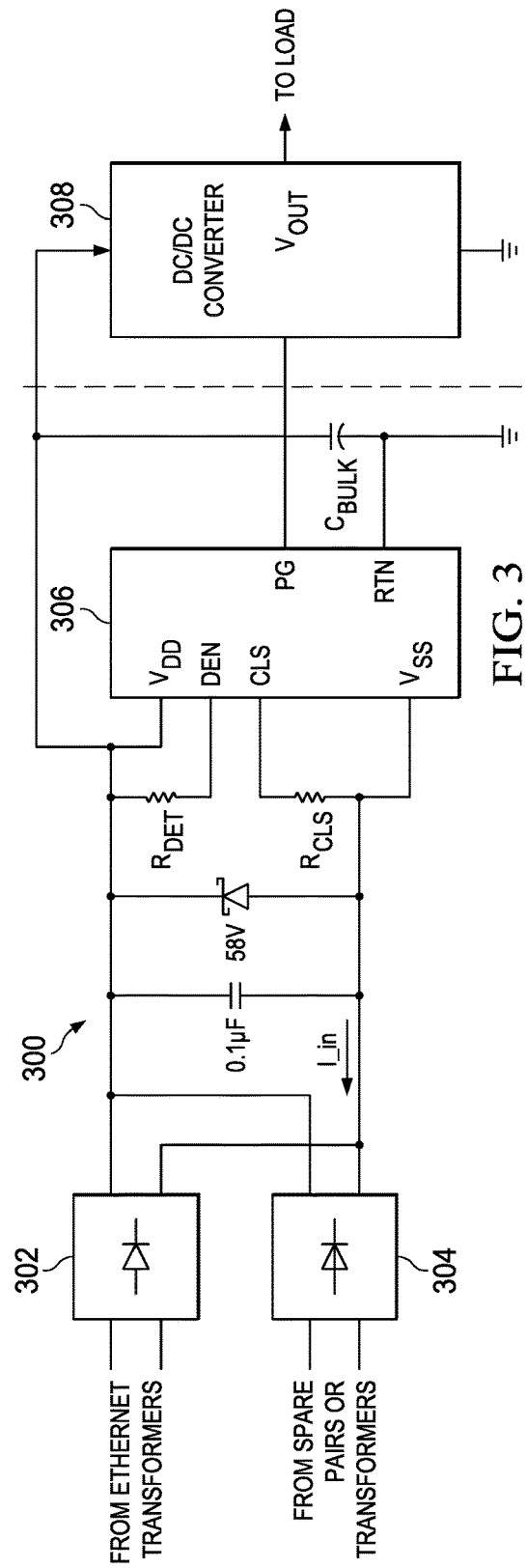
FIG. 3 is a schematic block diagram of a system in accordance with the present disclosure.

FIG. 3 is a schematic block diagram of a system within a PD, shown generally as 300. In FIG. 3, block 306 contains the circuitry which is shown in greater detail in FIGS. 4 and 5. The PD receives power from the PSE along two or four pairs of the four pairs of wires within the Ethernet cable, here labeled 302 and 304. A capacitor and a Zener diode protects against voltage spikes. At startup, the PSE looks for the resistor Rdet which is utilized to determine if a valid resistance, defined by the IEEE standard, is detected which indicates that the PD is requesting power from the PSE. The PSE then increases voltage and determines the amount of current drawn through the resistor Rcls which determines how much power is to be provided as defined by the IEEE standard. Once the input voltage has been increased to the operating voltage, the DC to DC converter 308 is turned on by pulling RTN to Vss in a controlled manner in order to control inrush current, as with all hot-swap devices. Then, the current is allowed up to its full current limit. A "power good" signal is provided at the terminal PG. The DC/DC converter 308, shown in FIG. 3, may not be part of the PD interface circuit, but is utilized to provide a controlled voltage to a load. This load may be LED lighting, for example. The capacitor Cbulk is utilized by the DC to DC converter during startup and to keep the voltage $V_{DD}$ input to the converter stable.

Figure 4:
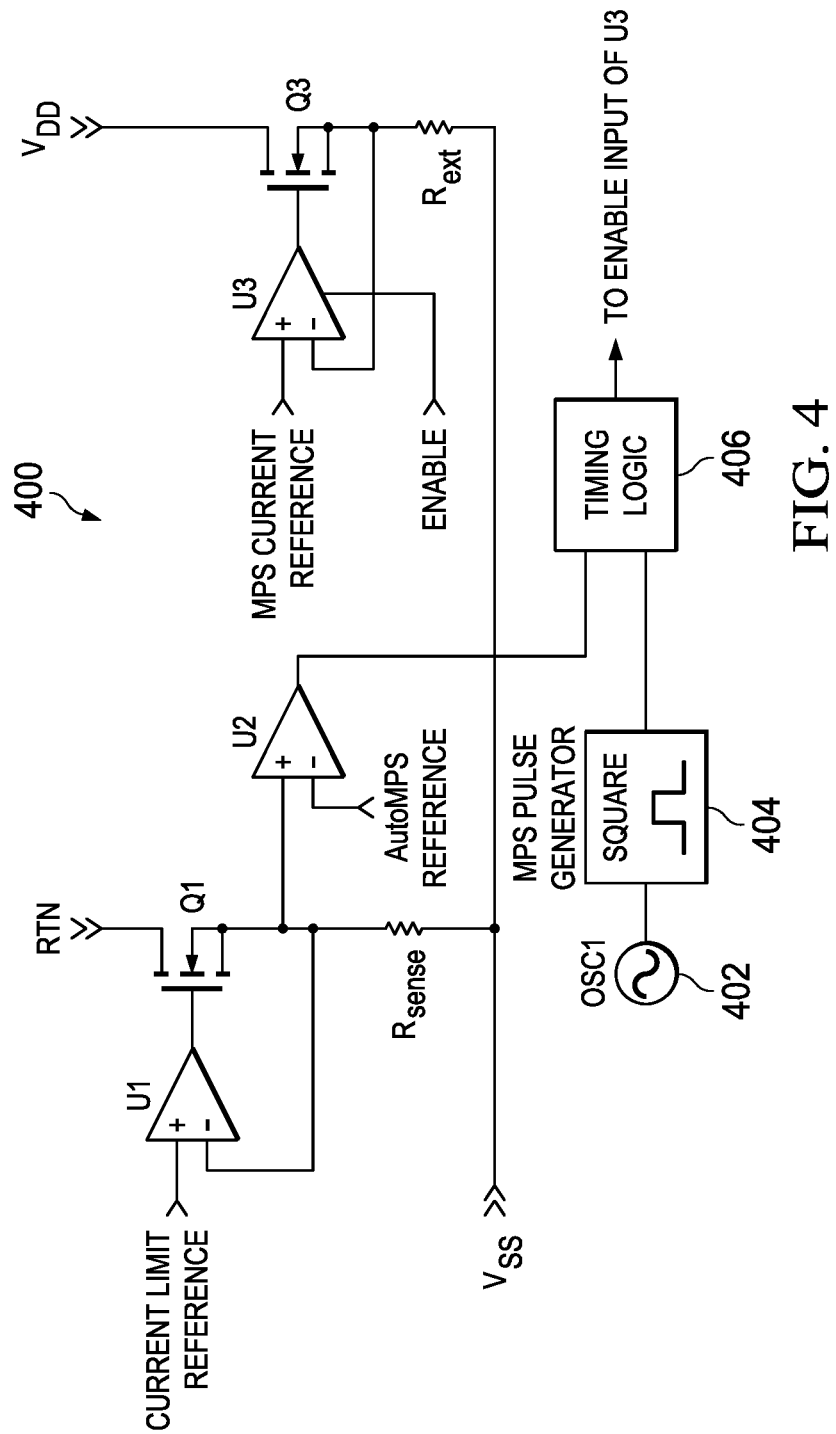
FIG. 4 is a schematic diagram of a first embodiment in accordance with the present disclosure.

FIG. 4 shows an embodiment of the circuit, shown in FIG. 3 as 306, generally as 400, although the circuit 306 may have other functions which are not shown. FIG. 4 has a current limit amplifier U1, having its non-inverting input coupled to a current limit reference (not shown) and its inverting input coupled to a node between an FET transistor Q1 and a sense resistor Rsense. The other terminal of transistor Q1 is connected to the return voltage RTN and the other terminal of the sense resistor is connected to $V_{SS}$. Current from the PD's load flows through RTN to $V_{SS}$, generating a voltage drop across Rsense which is used to measure the load current. If the voltage across the resistor exceeds the predetermined reference, Current Limit Reference, the transistor Q1 is used to limit the load current.

The node between transistor Q1 and resistor Rsense is also coupled to the non-inverting input of comparator U2. The inverting input of comparator U2 is coupled to an Auto MPS Reference (not shown). If the voltage across the resistor Rsense drops below the Auto MPS Reference, comparator U2 provides a signal to the timing logic 406, which, in turn, provides an enable signal to amplifier U3. Amplifier U3 has its non-inverting input coupled to a MPS Current Reference (not shown) and its inverting input coupled to a node between a transistor Q3 and resistor Rext. The other terminal of transistor Q3 is connected to $V_{DD}$ and the other terminal of the resistor Rext is connected to $V_{SS}$. An oscillator OSC1 402 generates a signal which is converted to pulses by MPS pulse generator 404 to control the timing logic 406 to produce the MPS signature pulses required to have the PSE maintain power to the PD. These pulses control amplifier U3 to generate a voltage at the node between the transistor and the external resistor Rext. The value of the external resistor determines the amount of current that is drawn, from $V_{DD}$ through the resistor Rext to $V_{SS}$, in order to provide the MPS signal to the PSE. The resistor Rext may be external to the integrated circuit, such as 306, and thus, can be utilized by the end-user to determine the amount of current that is needed to maintain power to the PD for that particular application.

FIG. 5 shows another embodiment of the circuit shown in FIG. 3 as 306, generally as 500, although the circuit 306 may have other functions which are not shown. In FIG. 5, a transistor Q1 is coupled between the return line RTN and a resistor R1, the other terminal of which is connected to $V_{SS}$. A switch S1 connects the gate of transistor Q1 with an output of error amplifier U1. Error amplifier U1 has its non-inverting terminal coupled to a current limit reference (not shown) and its inverting input coupled to the node between transistor Q1 and resistor R1. The error amplifier U1 measures the voltage across resistor R1 to determine if the current exceeds the maximum current limit and to regulate the current to that maximum limit. A transistor Q2 is coupled between the signal line RTN and a resistor R2, the other terminal which is coupled to the node between transistor Q1 and resistor R1. That node is also connected to the non-inverting input of comparator U2, the inverting input of which is connected to an Auto MPS reference (not shown). A switch S2 is coupled between the output of the error amplifier U1 and the gate or transistor Q2. A switch S4 is coupled between the gate of transistor Q2 and $V_{SS}$. A transistor Q3 is connected between the voltage $V_{DD}$ and a node between transistor Q2 and resistor R2. The gate of transistor Q3 is connected to an output of error amplifier U3, which has its non-inverting input connected to the MPS Reference (not shown) and its inverting input coupled to the node between transistor Q2 and resistor R 2.

An output of comparator U2 is coupled to the timing logic 506, which has outputs for each of the switches S1 through S4 and an enable output coupled to the enable input of error amplifier U3. An oscillator OSC1 502 generates a signal which is converted to pulses by MPS pulse generator 504, which are applied to timing logic 506. The timing logic utilizes the clock to generate the control signals for switches S1-S4 and for the pulses generated by error amplifier U3 and transistor Q3.

In normal operation switches S1 and S4 are closed and switches S3 and S2 are open, while in low power operation switches S2 and S3 are closed and switches S1 and S4 are open so that the current limiting action of error amplifier U1 is active as current limiting must always be provided. In normal operation, switch S4 is normally closed to maintain transistor Q2 off and switch S1 is closed to allow U1 to control the current through Q1. Switches S2 and S3 are open at this time. All the current from the load returns to the RTN node and passes through transistor Q1 and resistor R1. The voltage across resistor R1 is used to measure the current through the load and is applied to the inverting input of error amplifier U1. The Current Limit Reference is applied to the non-inverting input of error amplifier U1. This current measurement is utilized to limit the current, should the current exceed a predetermined threshold. The voltage across resistor R1 is also compared against the Auto MPS Reference applied to the inverting input of comparator U2, the output of which is utilized to control the timing logic control switches S1-S4. If the current through resistor R1 falls below a predetermined threshold, switches S1 and S4 are opened and switches S2 and S3 are closed by signals generated by the timing logic 506. This turns off transistor Q1 and turns on transistor Q2. Thus, the current returning from the PD load, through the RTN node, passes through transistor Q2, through resistor R2 and then through resistor R1 to Vss.

In order to minimize power dissipation, the value of resistor R1 value is kept as low as possible. However, at low currents this produces a large error when U2 is used to compare the load current to a threshold (Auto MPS Reference) due to any offset voltage of comparator U2. For example, with a value of 25 mΩ for R1, 1 mV offset in the comparator U2 can create a measurement error of 40 mA. Given the fact that the normal current needed to maintain power from the PSE to the PD is quite low (only 10-15 mA), this can be a significant error. In the circuit of FIG. 5, once the current is determined to be too low to maintain power from the PSE to the PD, a second resistor R2 is switched into the circuit. This resistor may be 50, for example. This resistor, along with resistor R1 in series, is used by U3 to generate any needed MPS current. This much larger resistance allows U3 to much more accurately control the MPS current, generating only an additional current needed. For example, a 1 mV offset in the amplifier U3, the error would only be 200 μA. Thus, this circuit permits the utilization of a low resistance shunt during normal operation to minimize the power loss in the shunt resistor, and then adds a higher resistance for generating a more accurate current pulse needed to maintain the power flow from the PSE to the PD, thus saving power.

If MPS pulses are needed, the timing logic 506 enables the enable input of error amplifier U3 to generate a voltage via transistor Q3 at the top of the resistor chain comprising R2 and R1, which determines the amount of additional current that needs to be passed through the circuit in order that the pulses, supplied to $V_{DD}$, meet or exceed the requirements for the MPS signature so that the PSE will continue to provide power to the PD. As the load current is also flowing through R1 and R2 and thus it is included in the current generated by U3, only the additional current needed to meet the MPS requirement is produced.

FIG. 6 shows one type of load for the DC/DC converter, such as DC/DC converter 308 in FIG. 3, generally as 600. As shown in FIG. 6, the load comprises a plurality of LEDs, such as 602a, 602b - - - 602n which would be connected from the Vout terminal of the converter to ground, for example. The number of LEDs in the string is a design choice. The LEDs may provide for general room lighting, for example, and not just indicate that power is applied to a device, such as the PD itself. Other circuits, which provide additional functionality, such as determining the occupancy of an area by way of a motion detector, for example, can also be connected as part of the load.

Although the invention has been described in detail, it should be understood that various changes, substitutions and alterations can be made thereto without departing from the spirit and scope of the invention as defined by the appended claims.

What is claimed is:

1. A powered device (PD) for use in a power over Ethernet (PoE) system, the PD device comprising:
   first and second voltage supply terminals associated with the PoE system;
   a return terminal associated with a load;
   a detection circuit configured to generate a maintain power signature (MPS) enable signal upon detecting a load current, between the return terminal and the second voltage supply terminal, less than a first MPS reference threshold; and
   a MPS generation circuit configured to generate a MPS pulse upon receiving the MPS enable signal, the MPS generation circuit configured to regulate an amplitude of the MPS pulse based on a second MPS reference threshold.

2. The PD device of claim 1, wherein:
   the first voltage supply terminal is configured to receive a first voltage VDD from a power supply equipment (PSE) of the PoE system;
   the second voltage supply terminal is configured to receive a second voltage VSS from the PSE of the PoE system; and
   the return terminal is configured to receive a ground voltage from the load.

3. The PD device of claim 1, wherein:
   the first MPS reference threshold includes an automatic MPS (AutoMPS) reference voltage compliant with IEEE 802.3-2012 and IEEE 802.3bt; and
   the second MPS reference threshold includes an MPS current reference voltage compliant with IEEE 802.3-2012 and IEEE 802.3bt.

4. The PD device of claim 1, wherein the second MPS reference threshold is greater than the first MPS reference threshold.

5. The PD device of claim 1, wherein the detection circuit includes:
   an amplifier stage coupled between the return terminal and the second voltage supply terminal, and having a sense node configured to develop a sense voltage representative of the load current; and
   a comparator having a non-inverting input coupled to the sense node, an inverting input coupled to receive the first MPS reference threshold, and an output configured to deliver the MPS enable signal.

6. The PD device of claim 5, wherein the amplifier stage includes:
   a transistor coupled between the return terminal and the sense node; and
   a resistor coupled between the sense node and the second voltage supply terminal.

7. The PD device of claim 6, wherein the amplifier stage includes:
   an error amplifier having a non-inverting input coupled to receive a current limit reference, an inverting input coupled to the sense node, and an output coupled to a gate terminal of the transistor.

8. The PD device of claim 5, wherein the MPS generation circuit includes:

a transistor coupled between the first voltage supply terminal and an MPS node configured to output the MPS pulse;
a resistor coupled between the MPS node and the second voltage supply terminal; and
an amplifier having a non-inverting input coupled to receive the second MPS reference threshold, an inverting input coupled to the MPS node, and an output coupled to a gate terminal of the transistor.

9. The PD device of claim 1, wherein the detection circuit include:
a first stage coupled between the return terminal and the second voltage supply terminal, and configured to develop, at a sense node, a first sense voltage representative of the load current when the first stage is enabled;
a second stage coupled between the return terminal and the second voltage supply terminal, and configured to develop, at the sense node, a second sense voltage representative of the load current when the second stage is enabled; and
a timing logic configured to enable the first stage and disable the second stage when the MPS enable signal is absent, and configured to disable the first stage and enable the second stage when the MPS enable signal is generated.

10. The PD device of claim 9, wherein:
the first stage includes a first transistor coupled between the return terminal and the sense node, and a first resistor coupled between the sense node and the second voltage supply terminal; and
the second stage includes a second transistor coupled between the return terminal and an MPS node, and a second resistor coupled between the MPS node and the sense node.

11. The PD device of claim 10, wherein the detection circuit includes:
an error amplifier having a non-inverting input coupled to receive a current limit reference, an inverting input coupled to the sense node, and an output;
a first switch coupled between the output of the error amplifier and a first gate of the first transistor, the first switch configured to be closed by the timing logic when the MPS enable signal is absent; and
a second switch coupled between the output of the error amplifier and a second gate of the second transistor, the second switch configured to be closed by the timing logic when the MPS enable signal is generated.

12. The PD device of claim 11, wherein the detection circuit includes:
a third switch coupled between the first gate of the first transistor and the second voltage supply terminal, the third switch configured to be closed by the timing logic when the MPS enable signal is generated; and
a fourth switch coupled between the second gate of the second transistor and the sense node, the third switch configured to be closed by the timing logic when the MPS enable signal is absent.

13. The PD device of claim 10, wherein the MPS generation circuit includes:
a third transistor coupled between the first voltage supply terminal and the MPS node configured to output the MPS pulse; and
an amplifier having a non-inverting input coupled to receive the second MPS reference threshold, an inverting input coupled to the MPS node, and an output coupled to a third gate of the third transistor.

14. The PD device of claim 9, wherein the detection circuit includes:
a comparator having a non-inverting input coupled to the sense node, an inverting input coupled to receive the first MPS reference threshold, and an output configured to assert the MPS enable signal.

15. An integrated circuit (IC) for use in a powered device (PD) of a power over Ethernet (PoE) system, the IC comprising:
first and second voltage supply terminals associated with the PoE system;
a return terminal associated with a load;
a detection circuit including:
an amplifier stage having a sense node configured to develop a sense voltage representative of a load current between the return terminal and the second voltage supply terminal; and
a comparator having a non-inverting input coupled to the sense node, an inverting input coupled to receive a first maintain power signature (MPS) reference threshold, and an output configured to deliver an MPS enable signal; and
an MPS generation circuit configured to generate a MPS pulse between the first and second voltage supply terminals and upon receiving the MPS enable signal, the MPS generation circuit configured to regulate an amplitude of the MPS pulse based on a second MPS reference threshold.

16. The IC of claim 15, wherein the amplifier stage includes:
a transistor coupled between the return terminal and the sense node;
a resistor coupled between the sense node and the second voltage supply terminal; and
an error amplifier having a non-inverting input coupled to receive a current limit reference, an inverting input coupled to the sense node, and an output coupled to a gate terminal of the transistor.

17. The IC of claim 15, wherein the MPS generation circuit includes:
a transistor coupled between the first voltage supply terminal and an MPS node configured to output the MPS pulse;
a resistor coupled between the MPS node and the second voltage supply terminal; and
an amplifier having a non-inverting input coupled to receive the second MPS reference threshold, an inverting input coupled to the MPS node, and an output coupled to a gate terminal of the transistor.

18. An integrated circuit (IC) for use in a power delivery (PD) device of a power over Ethernet (PoE) system, the IC comprising:
first and second voltage supply terminals associated with the PoE system;
a return terminal associated with a load;
a first stage includes a first transistor coupled between the return terminal and a sense node, and a first resistor coupled between the sense node and the second voltage supply terminal;
a second stage includes a second transistor coupled between the return terminal and an MPS node, and a second resistor coupled between the MPS node and the sense node;
a comparator configured to assert a maintain power signature (MPS) enable signal when a sense voltage at the sense node is less than a first MPS reference threshold, and configured to reset the MPS enable signal when the sense voltage is greater than the first MPS reference threshold;

a timing logic configured to enable the first stage and disable the second stage when the MPS enable signal is reset, and configured to disable the first stage and enable the second stage when the MPS enable signal is asserted; and a MPS generation circuit configured to generate a MPS pulse, at the MPS node, upon receiving the MPS enable signal, the MPS generation circuit configured to regulate an amplitude of the MPS pulse based on a second MPS reference threshold.

19. The IC of claim 18, further comprising:

an error amplifier having a non-inverting input coupled to receive a current limit reference, an inverting input coupled to the sense node, and an output;

a first switch coupled between the output of the error amplifier and a first gate of the first transistor, the first switch configured to be closed by the timing logic when the MPS enable signal is reset;

a second switch coupled between the output of the error amplifier and a second gate of the second transistor, the second switch configured to be closed by the timing logic when the MPS enable signal is asserted;

a third switch coupled between the first gate of the first transistor and the second voltage supply terminal, the third switch configured to be closed by the timing logic when the MPS enable signal is asserted; and a fourth switch coupled between the second gate of the second transistor and the sense node, the third switch configured to be closed by the timing logic when the MPS enable signal is reset.

20. The IC of claim 18, wherein the MPS generation circuit includes:

a third transistor coupled between the first voltage supply terminal and the MPS node configured to output the MPS pulse; and an amplifier having a non-inverting input coupled to receive the second MPS reference threshold, an inverting input coupled to the MPS node, and an output coupled to a third gate of the third transistor.

* * * * *